United States Patent [19]

Jockel et al.

[11] 4,316,880

[45] Feb. 23, 1982

[54] PROCESS FOR PRODUCING CARBON MONOXIDE AND HYDROGEN FROM METHANOL

[75] Inventors: Heinz Jockel, Büttelborn; Friedemann Marschner, Oberursel; Friedrich W. Möller, Friedrichsdorf; Hans-Günter Mörtel, Frankfurt am Main, all of Fed. Rep. of Germany

[73] Assignee: Metallgesellschaft, Aktiengesellschaft, Frankfurt, Fed. Rep. of Germany

[21] Appl. No.: 147,040

[22] Filed: May 6, 1980

[30] Foreign Application Priority Data

May 8, 1979 [DE] Fed. Rep. of Germany ....... 2918405

[51] Int. Cl.³ .................... C01B 31/18; C01B 1/13
[52] U.S. Cl. ................ 423/415 A; 423/648 R; 252/373
[58] Field of Search .............. 423/415, 648, 653; 252/373; 55/75

[56] References Cited

U.S. PATENT DOCUMENTS

| 3,789,106 | 1/1974 | Hay | 423/648 |
| 4,088,450 | 5/1978 | Rosaka et al. | 252/373 X |
| 4,091,086 | 5/1978 | Hinden et al. | 252/373 X |
| 4,129,424 | 12/1978 | Armand | 55/75 |
| 4,175,115 | 11/1979 | Ball et al. | 423/648 R X |

FOREIGN PATENT DOCUMENTS

| 633058 | 12/1961 | Canada | 423/648 |
| 1010574 | 4/1964 | United Kingdom | 423/648 |

OTHER PUBLICATIONS

Morelli, et al, "Journ. of Cat." 26 (1972) pp. 106–111.

*Primary Examiner*—G. O. Peters
*Attorney, Agent, or Firm*—Sprung, Felfe, Horn, Lynch & Kramer

[57] ABSTRACT

A process is described for producing carbon monoxide and hydrogen which comprises contacting methanol vapor at a temperature of 200° to 500° C. with an indirectly heated zinc containing catalyst while said methanol vapor is at a pressure in a range of 2 to 50 bars, whereby to obtain an effluent gas in which the components of carbon monoxide and hydrogen constitute at least 90% by volume of said gas, removing at least a part of the impurities from said effluent gas and separating said effluent gas into its carbon monoxide and hydrogen components by adsorption. The effluent gas can be separated into its carbon monoxide and hydrogen components by use of a plurality of adsorbers containing zeolite-type molecular sieve material where the zeolite is substantially permeable to hydrogen but sorbs carbon monoxide.

3 Claims, 1 Drawing Figure

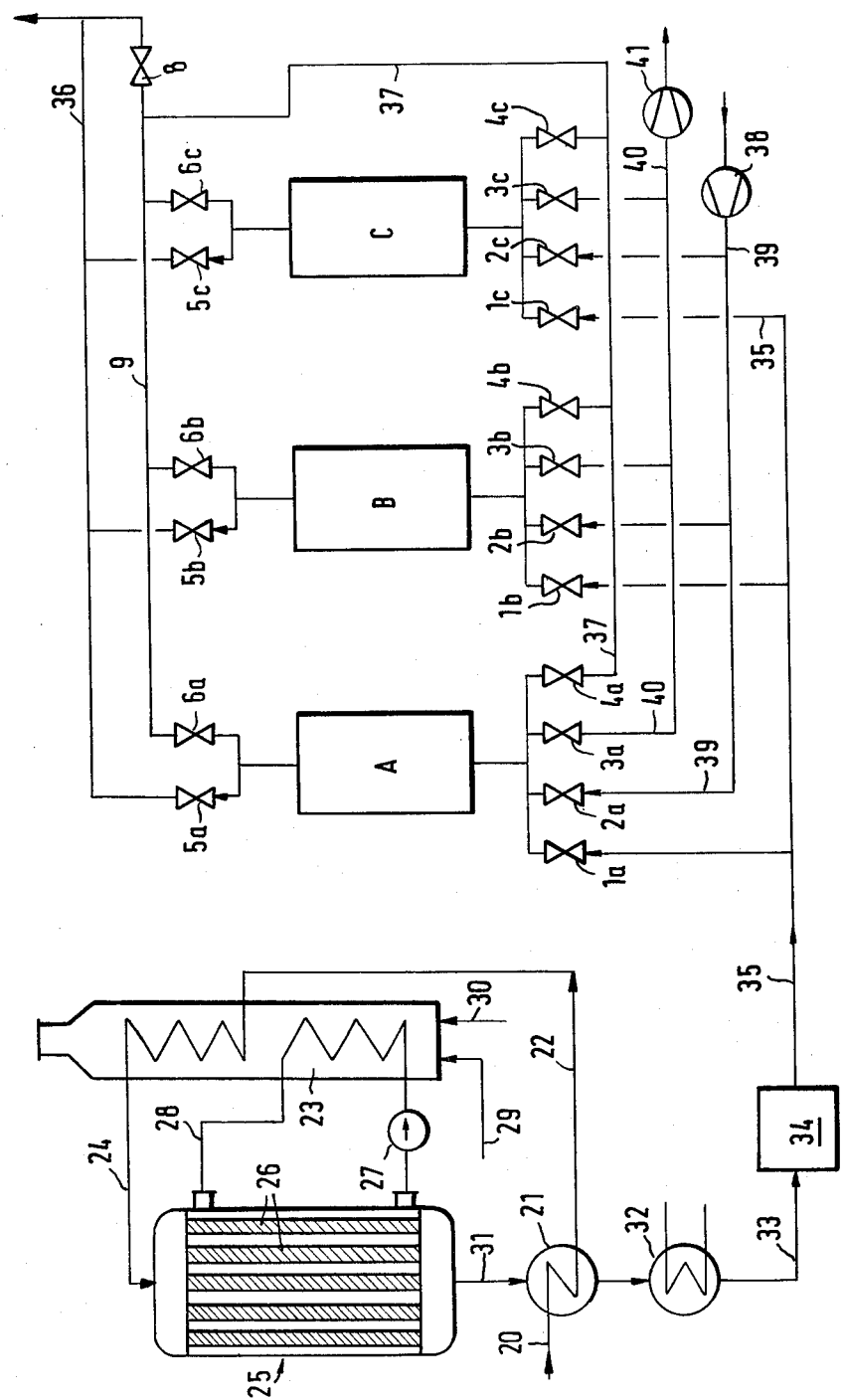

PROCESS FOR PRODUCING CARBON MONOXIDE AND HYDROGEN FROM METHANOL

This invention relates to a process of producing carbon monoxide and hydrogen, which are separately discharged.

It is an object of the invention to make these gases available at low cost. In this connection it is also important that the plant can be designed for relatively low production rates. In accordance with the invention this is accomplished in that methanol vapor is dissociated on an indirectly heated, zinc-containing catalyst at temperatures of 200° to 500° C. and at a pressure in the range of 2 to 50 bars to form an effluent gas in which the components CO and $H_2$ constitue at least 90% by volume, at least part of the impurities are removed from the effluent gas and the latter is separated into the components CO and $H_2$ by adsorption. The use of methanol as starting material simplifies the process and reduces its cost because methanol can be stored and evaporated without great difficulties.

Whereas the methanol used in the process need not have a particularly high purity, the methanol vapor to be dissociated should contain water vapor not in excess of 20% by weight and preferably in the range of 2 to 10% by weight in order to minimize the $CO_2$ content of the effluent gas. For the subsequent separation of carbon monoxide by adsorption, it will be desirable if the dissociated effluent gas contains methane not in excess of 1% by volume because such methane will be removed by adsorption together with the carbon monoxide.

Zinc-containing catalysts differing in composition may be used to dissociate the methanol vapor. A suitable catalyst contains 50 to 90% by weight ZnO and 10 to 30% by weight $Cr_2O_3$. Where this catalyst is used, the temperature in the dissociating stage is maintained in the range of about 300° to 500° C., preferably of 350° to 450° C.

Another suitable catalyst contains about 20 to 50 atomic percent zinc, about 40 to 60 atomic percent copper and about 10 to 20 atomic percent vanadium. Where this catylast is used, the dissociation temperatures are lower and lie at about 200° to 300° C., preferably at 250° to 270° C. Details of the production of catalyst of this type are known from German Pat. No. 1,930,702 and the corresponding U.S. Pat. 3,897,471. In said publications it is proposed to use the catalyst for the synthesis of methanol. Generally, per kg of catalyst 1-3 kg/h of methanol are fed into the dissociation zone.

The catalytic dissociation of the methanol vapor is suitably effected in a tubular reactor, which has catalyst-filled tubes that are heated from the outside by a liquid bath. Heat must be supplied because heat is consumed as methanol is dissociated.

The impurities contained in the dissociated effluent gas consist mainly of water vapor and/or carbon monoxide, which should be removed before the further processing of the gas. The water vapor can be removed by condensation. Known scrubbing process using, e.g., monoethanolamine, may be used, for instance, to remove $CO_2$. Alternatively, these impurities may be removed by known adsorption processes using, e.g., molecular sieves.

The separation of carbon monoxide and hydrogen by adsorption will be facilitated when the above-mentioned impurities have previously been removed as completely as possible required. The degree of that removal will depend also on the purity which is desired for the carbon monoxide and hydrogen to be produced. It is preferred to have residual impurities in the $CO/H_2$ mixture of less than about 6 percent by volume.

The separation of CO and $H_2$ may be effected, e.g., in that the effluent gas from which at least part of the impurities have been removed is fed under a pressure of 2 to 10 bars to one of several adsorbers. which contain zeolite-type molecular sieve material, which is substantially permeable to hydrogen. Molecular sieves of that kind are known and have usually a defined pore diameter of 3 to 5 Angström.

In a suitable separating process, each adsorber is charged with effluent gas and $H_2$ is withdrawn, the charging is continued beyond the breakthrough of CO, the mixed CO-$H_2$ effluents are fed to another adsorber, the first-mentioned adsorber is subsequently scaveneged with virtually pure CO to removed residual $H_2$, the adsorber is subsequently pressure-relieved to remove the virtually pure CO by desorption, and the supply of effluent gas is then renewed. All adsorbers pass through the same process steps but are operated with a phase displacement so that a different process step is performed in each adsorber at any given time.

An embodiment of the process will now be explained with reference to the drawing, showing a flow diagram.

Liquid methanol is fed in conduit 20 and evaporated in heat exhcanger 21. The methanol vapor flows in duct 22 to a fired heater 23 and leaves the same in duct 24, e.g., at temperatures of 300° to 500° C.

The methanol vapor then enters a tubular reactor 25, the tubes 26 of which contain a zinc-containing catalyst. The tubes are surrounded by a hot salt bath, which is circulated through the heater and the conduit 28 by a circulating pump 27. The heater 23 is supplied with air from duct 29 and with fuel from conduit 30.

The effluent gas resulting from the dissociation of methanol leaves the reactor 25 in duct 31 and flows through the heat exchanger 21 first and then through another heat exhcanger 32. At least 90% by volume, preferably at least 95% by volume, of the effluent gas leaving the heat exchanger 32 in duct 33 consist of CO and $H_2$.

The gas is first treated to remove those impurities which would be disturbing in the subsequent separation by adsorption. Such impurities are mainly water vapor and $CO_2$. For this purpose the effluent gas is passed through a purifying stage 34, which may be designed in known manner to dry the gas and also to remove $CO_2$. $CO_2$ need not be removed if the gas in duct 33 has a sufficiently low $CO_2$ content, for instance, below 5% by volume, so that residual $CO_2$ will/not be disturbing in the separated CO. This will also depend on the purity which is desired for the recovered carbon monoxide.

A gas consisting virtually only of carbon monoxide and hydrogen is fed in duct 35 to the stage for separation by adsorption. The separating stage comprises three adsorbers A, B, and C, which are filled with a suitable zeolite. Ducts which incorporate valves 1a, 2a, 3a, 4a, 5a, and 6a are associated with the adsorber A. Ducts which incorporate valves 1b to 6b are associated with the adsorber B. Ducts which incorporate valves 1c to 6c are associated with adsorber C. All three adsorbers perform the same process steps in succession but are in different states at any given time. To explain the operation of the separating stage, the consecutive process steps in the adsorber A will now be considered first.

Through the opened valve 1a in duct 35, the mixture of CO and $H_2$ flows into the adsorber A. Hydrogen can pass through the adsorbent and flows through the opened valve 5a into the hydrogen-collecting manifold 36. The remaining valves associated with the adsorber A are closed. The adsorber becomes increasingly laden with carbon monoxide and retains also a small proportion of hydrogen.

As soon as the adsorber A has been laden with CO to such a degree that there is a breakthrough of CO, which is then contained in the hydrogen effluent, the valve 5a is closed and the valve 6a is opened. The mixed CO and $H_2$ effluents from the adsorber A are now conducted through ducts 9 and 37 and the opened valve 4b to the adsorber 8, which has been switched for adsorption at that instant. Hydrogen from the adsorber B flows through the opened valve 5b to the manifold 36.

Some time after the breakthrough of CO in the adsorber A, the supply of gas through the valve 1a is interrupted and the adsorber A is subsequently scavenged. This is accomplished in that CO from a reservoir, not shown, is fed by means of a blower 38 through a duct 39 and the opened valve 2a into the adsorber A. The hydrogen contained in the adsorber A is thus displaced by the CO to flow through the opened valve 6a, ducts 9 and 37, and the opened valve 4b also to the adsorber 8.

When the adsorber A has been scavenged, it is laden only with CO, which is withdrawn and recovered by desorption. For this purpose the valves 5a and 6a are closed and the adsorber A is pressure-relieved through the opened valve 3a. At this time, carbon monoxide is withdrawn through the duct 40 by the pump 41, which consists preferably of a vacuum pump, so that subatmospheric pressures of about 50 to 500 millibars can be obtained in the adsorber A during the desorption. The pump 41 forces the CO into the above-mentioned reservoir, not shown.

After the desorption, the pressure in the adsorber A must be raised so that the pressure of the gas in duct 35 will not result in a detrimental pressure surge. For an equalization of pressure, the valves 1a to 5a are closed and the valve 6a is opened to admit $H_2$ gas from duct 36 through control valve 8 into the adsorber A. When the pressure has been equalized, the adsorber A is switched for adsorption and is now supplied with gas from duct 35 through the opened valve 1a and is supplied for a short time with a mixture of CO and $H_2$ (brokenthrough gas) from the adsorber C through ducts 9 and 37 and the opened valve 4a. When the adsorber C has been switched for the scavenging step, the adsorption of effluent gas from the duct 35 is continued in the adsorber A beyond the breakthrough of CO, as has been described hereinbefore.

As has been explained, the three adsorbers are in different states at any given time. When the desorption in adsorber A begins, the adsorber 8 has just been switched for the adsorption of gas coming from duct 35 and is delivering hydrogen to the collecting manifold 36. At the same time, the adsorber C is being scavenged with CO fed from the reservoir by means of the blower 38. To permit the use of ducts 9 and 37 for conducting different gases, the scavenging, equalization of pressure, and delivery of breakthrough gas in the various adsorbers are effected during different periods of time.

EXAMPLE

A system corresponding to that shown on the drawing is operated as follows: At a rate of 1000 kg per hour, liquid methanol at 10° C. and 22 bars is supplied in conduit 20 and is evaporated in the heat exchanger 21 by being heated therein to 160° C. The methanol vapor is superheated to a temperature of 400° C. in the fired superheater 23 and is then fed in duct 24 to the tubular reactor 25, in which the superheated methanol vapor is distributed to 280 tubes, which are filled with catalyst. The catalyst consists of 78% by weight ZnO and 22% by weight $Cr_2O_3$. The tubes of the reactor 25 are indirectly heated by a molten salt bath having a melting point of 140° C. and consisting of 59% by weight potassium nitrate and 41% by weight sodium nitrate.

Effluent gas consisting of 30.3% by volume CO, 67.1% by volume $H_2$, and 2.3% by volume $CO_2$ leaves the reactor 25 at a rate of 2065 standard $m^3$ per hour and is fed in duct 31 to the heat exchanger 21. That gas is at a temperature of 450° C. and a pressure of 20 bars and is free from methane. The gas is cooled to 50° C. in the heat exchanger 21 and is cooled to 30° C. by cooling water in the succeeding cooler 32.

In the duct 33, the gas flows under a pressure of 19.5 bars to the purifying stage 34, which consists of two adsorbers filled with commercially available molecular sieve material. The adsorbers are switched for adsorption and regeneration in alternation. The gas is freed from residual water, $CO_2$ and methanol traces in the adsorbers. The molecular sieve material is thermally regenerated by means of high-hydrogen gas supplied in duct 36 from the adsorption plant, which will be subsequently described.

Said high-hydrogen gas is available under a pressure of 3.4 bars. Each adsorber of the purifying stage 34 is switched for adsorption for 8 hours. The subsequent desorption is effected with the additional use of a heater for supplying the heat for desorption to the regenerating gas, and with a cooler and separator for cooling the regenerating gas which has left the adsorber that is to be regenerated. These details are not shown on the drawing.

the gas which leaves the purifying stage 34 in duct 35 at a rate of 2010 $m^3$ per hour consists of 31% by volume CO and 69% by volume $H_2$. The gas is first pressure-relieved to 3.5 bars and is then passed through one of the three adsorbers A, B, and C, the mode of operation of which has been explained hereinbefore. The adsorbers are filled with a zeolite which is commercially available from Bayer AG as Type K 155.

As has been described hereinbefore, each of the three adsorbers A, B and C is operated to perform said steps in succession and all three adsorbers are in different states at any given time. Each adsorber is switched for adsorption for about 3 minutes and for desorption also for 3 minutes. The state of adsorption in which mixed CO and $H_2$ effluents (brokenthrough gas) leaves the adsorber lasts about 1 minute and about 1 minute is also required for the subsequent scavenging with CO. During the desorption, the pressure is decreased to 100 millibars. The pressurization of the adsorber (equalization of pressure), which is required after the adsorption and effected by a supply of high-hydrogen gas from duct 36, takes about 1 minute.

The high-hydrogen gas in duct 36 consists of 94.1% by volume $H_2$ and 5.9% by volume CO. The CO product gas delivered in duct 40 contains 98% by volume CO and 2% by volume $H_2$ and is at a temperature of 30° C. and at approximately atmospheric pressure. Unless the high-hydrogen gas in the duct 36 is to be used for other purposes, the surplus may be used to fire the heater 23.

We claim:

1. A process for producing carbon monoxide and hydrogen which comprises contacting methanol vapor containing water vapor in an amount of 2 to 10 percent by weight at a temperature of 200° to 300° C. and a pressure in the range of 2 to 50 bars with an indirectly heated catalyst comprising 20 to 50 atomic percent zinc, 40 to 60 atomic percent copper, and 10 to 20 atomic percent vanadium, whereby to obtain an effluent gas rich in carbon monoxide in which the components of carbon monoxide and hydrogen constitute at least 90% by volume of said gas, removing at least a part of the water vapor and carbon dioxide impurities from said effluent gas, and separating said effluent gas into its carbon monoxide and hydrogen components by adsorption by feeding said effluent gas under pressure of 2 to 10 bars to one of several zeolite type molecular sieve containing adsorbers where the zeolite is substantially permeable to hydrogen, said adsorption process comprising feeding said effluent to a first adsorber containing a zeolite type molecular sieve and withdrawing hydrogen from said adsorber, continuing to charge said first adsorber beyond a breakthrough of carbon monoxide, withdrawing carbon monoxide-hydrogen from said frist adsorber and feeding it to a second adsorber, thereafter scavenging said first absorber by introducing virtually pure carbon monoxide to remove residual hydrogen from said first absorber, removing virtually pure carbon monoxide from said first absorber by pressure relieving said first adsorber whereby carbon monoxide is desorbed from the molecular sieve therein, renewing effluent gas supply to said first adsorber and while said first adsorber is being pressure relieved, feeding effluent gas to a second adsorber.

2. A process according to claim 1 wherein the effluent gas contains methane in the amount of not more than 1% by volume.

3. A process according to claim 1 wherein the catalyst is disposed in tubes which are heated externally by a liquid bath.

* * * * *

UNITED STATES PATENT AND TRADEMARK OFFICE
CERTIFICATE OF CORRECTION

PATENT NO. : 4,316,880

DATED : February 23, 1982

INVENTOR(S) : HEINZ JOCKEL, FRIEDEMANN MARSCHNER, FRIEDRICH W. MÖLLER, HANS-GÜNTER MÖRTEL

It is certified that error appears in the above-identified patent and that said Letters Patent are hereby corrected as shown below:

| COLUMN | LINE | |
|---|---|---|
| 3 | 60 | change "8" to --B--. |

Signed and Sealed this

Twenty-fifth Day of May 1982

[SEAL]

Attest:

Attesting Officer

GERALD J. MOSSINGHOFF

Commissioner of Patents and Trademarks